No. 629,644. Patented July 25, 1899.
L. AXTELL.
METHOD OF AND APPARATUS FOR TREATING CASEIN CURD.
(Application filed May 26, 1898.)
(No Model.) 2 Sheets—Sheet 1.
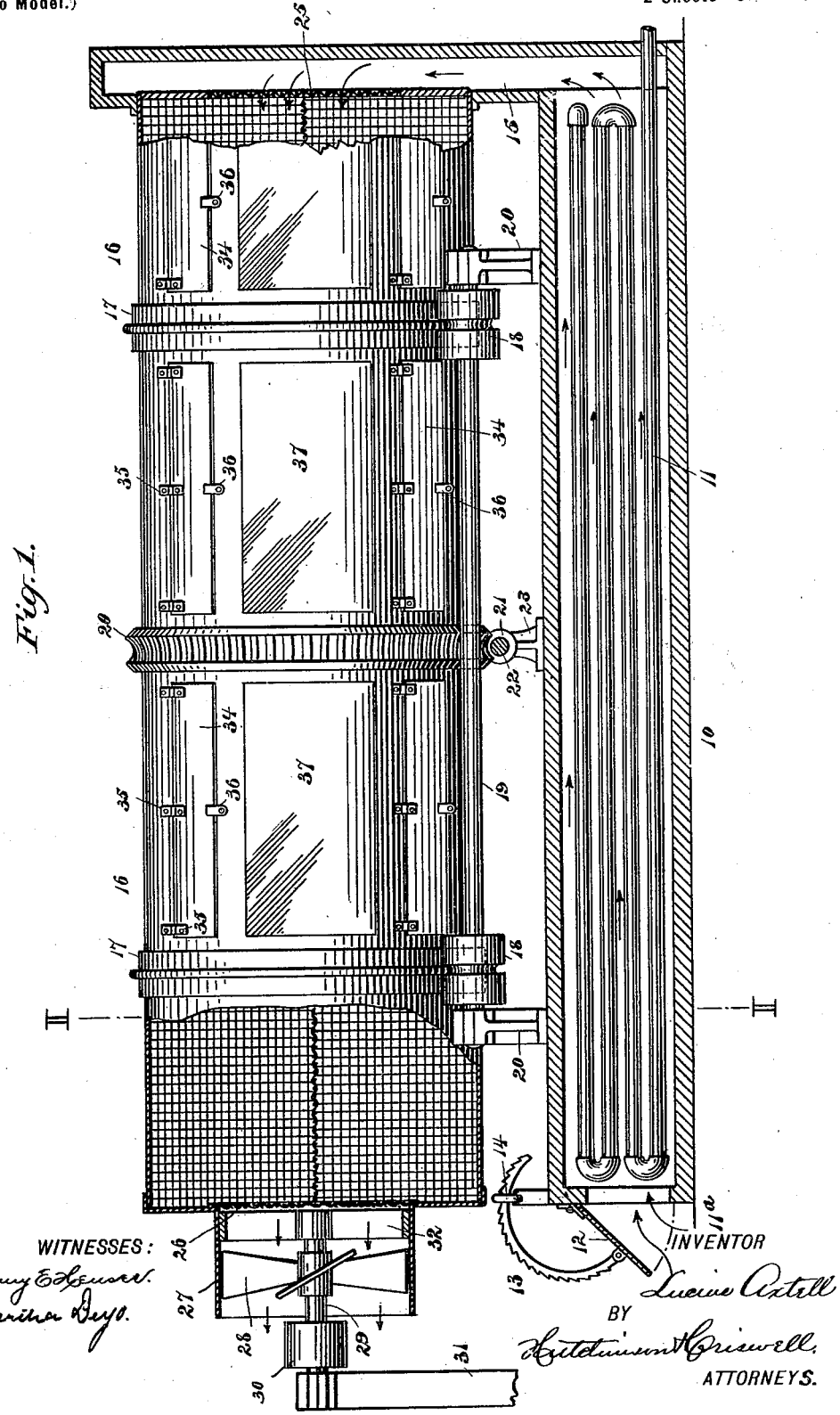

No. 629,644. Patented July 25, 1899.
L. AXTELL.
METHOD OF AND APPARATUS FOR TREATING CASEIN CURD.
(Application filed May 26, 1898.)
(No Model.) 2 Sheets—Sheet 2.
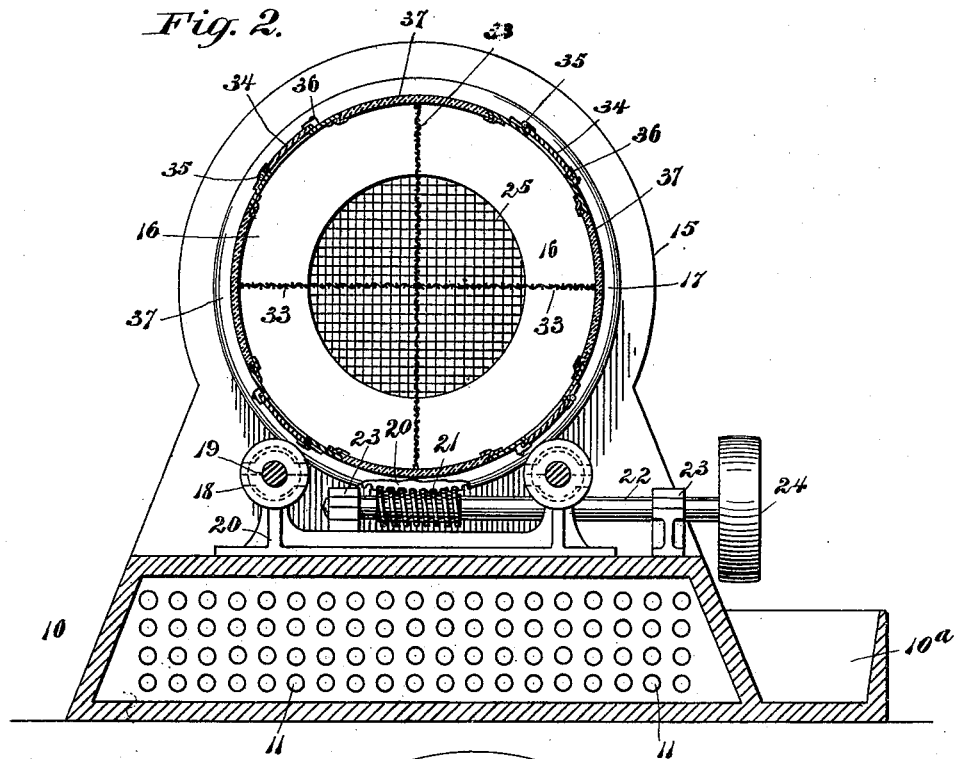
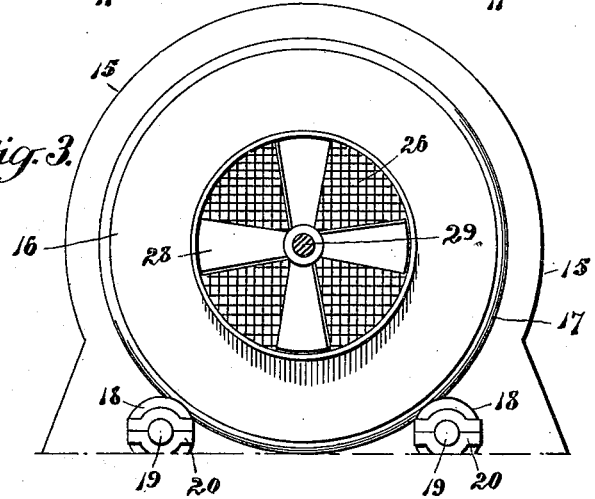
WITNESSES:
INVENTOR
Lucius Axtell
BY
Hutchinson & Criswell
ATTORNEYS.

United States Patent Office.

LUCIUS AXTELL, OF TOMPKINS, NEW YORK, ASSIGNOR TO DAVID W. LEWIS, OF ROCK ROYAL, NEW YORK.

METHOD OF AND APPARATUS FOR TREATING CASEIN CURD.

SPECIFICATION forming part of Letters Patent No. 629,644, dated July 25, 1899.

Application filed May 26, 1898. Serial No. 681,779. (No model.)

*To all whom it may concern:*

Be it known that I, LUCIUS AXTELL, of the town of Tompkins, county of Delaware, and State of New York, have invented certain new and useful Improvements in Methods of and Apparatus for Treating Casein, of which the following is a full, clear, and exact description.

This invention relates to a method of and apparatus for treating casein, but more particularly to treating what is commonly known as "casein curd."

The primary object of the invention is to provide a method and apparatus whereby casein curd of a gluey consistency may be treated so as to produce a dry brittle article which will be white and durable, so as to materially enhance the value of the same, and to provide an article which is better adapted for use in the manufacture of paper.

A further object of the invention is to provide a simple and efficient apparatus by which the glutinous curd may be agitated and subjected to a drying and oxidizing agent while exposed to light and which will permit the curd to be under complete control while the process is being carried into effect.

With these and other objects in view the invention consists in the method and apparatus substantially as hereinafter described and then pointed out in the claims at the end of the description.

Referring to the accompanying drawings, forming a part of this specification, Figure 1 is a vertical longitudinal section, partly in elevation, of one form of apparatus embodying my invention. Fig. 2 is a transverse vertical section taken on the line II II of Fig. 1; and Fig. 3 is a vertical sectional view taken immediately in front of the exhaust-fan, the lower portion of the apparatus being broken away.

The hollow base 10 may be of any suitable form or material and may have at one side thereof a trough or receptacle, as 10ª, into which the material after being treated may be placed for removal, and in the base 10 is arranged a coil or series of coils of pipe 11, through which may pass a suitable heating medium, as steam, in order to heat the air or other agent which may pass into the base through the opening 11ª in the forward portion thereof. The opening 11ª is controlled by a suitable door 12, which may have a rack 13, adapted to be engaged by a pivoted pawl 14, arranged on the base 10, so as to adapt the door 12 to be readily raised or lowered to any desired position to regulate the quantity of air to be heated, though instead of this construction other means may be employed for regulating the supply of air. At its rear end the hollow base 10 merges in a chamber 15, which projects upward from the base and receives one end of the rotatable drum 16, so that the heated air from the base passes upward through the chamber 15 and into the drum 16, as more specifically pointed out below.

The drum 16 may be of any desired form or construction and operated in any suitable manner. As shown, the drum is in the form of a cylinder and has at any suitable point flanged rings or runners 17, the flanges of which engage grooves in the supporting-wheels 18, the latter being secured on shafts 19, which are journaled in the bearings 20, the latter extending transversely of the machine, so that the grooved wheels 18 will support the drum on opposite sides of its vertical center. The drum 16, intermediate its ends, may be provided with a worm-gear 20, which is normally in mesh with a worm 21, arranged on the shaft 22. This shaft is journaled in bearings 23 and has a pulley 24 secured thereto, so that when the shaft 22 is rotated the worm 21, through the worm-gear 20, will cause rotary motion to be imparted to the drum 16. The drum 16 may have at one end thereof a suitable screen or gauze 25, through which the air from the chamber 15 is deflected, and at the opposite end thereof may have an opening covered by a suitable screen or gauze 26. The forward end of the drum is reduced somewhat, as at 27, in which may be arranged an exhaust-fan 28, secured to a shaft 29 and rotated by means of a pulley, as 30, the shaft 29 being journaled in a spider, as 32, arranged in the portion 27 of the drum and in a suitable bearing, as 31, or otherwise, as desired. By this means when movement in the proper direction is given to the fan 28 air will be drawn into the opening 11ª through the base 10, where it is heated and from there passes into the chamber 15 and then through the drum 16, so as to come in contact with the curd in the drum.

For the purpose of imparting a vibratory action as well as a rotary action to agitate the curd and to subject the same to the action of light while being treated I arrange longitudinally of the drum intersecting plates 33, so as to form pockets in which the curd is placed. As shown, the plates are of wire-gauze of any suitable mesh and are arranged so as to form four pockets or divisions, but this number may be varied if found desirable. Each pocket of the drum is provided with an opening controlled by a door 34, which may be hinged, as at 35, to the drum and normally secured in a closed position by a catch or pivoted latch, as 36, so that the material may be readily placed in the pockets and held therein during the movement of the drum or removed after the curd has been treated. The drum 16 may be of any suitable material and at intervals thereof may have windows or openings therein in which are placed the plates 37, which may conform to the contour of the drum and may be of either glass or other transparent or translucent material in order to subject the curd to light during treatment, so as to cause a whitening or bleaching effect, though instead of the windows 37 any part, either as an entirety or portions thereof, may be made of transparent or translucent material.

The woven-wire screens adjusted inside of the cylinder and dividing the same into divisions or sections results when the cylinder is kept in continuous rotary motion in the sliding of the curd upon the plates or screens, which screens, owing to their being more or less flexible, impart a vibratory motion to the curd, so as to jar or loosen the particles thereof. The curd thus being kept in continuous motion for some hours by the action of the air, will pulverize gradually, and the cylinder being constructed in part of glass or other translucent substance keeps the curd subject to motion, light, and heated air all at the same time, thus securing the transformation of the soft glutinous curd into a dry merchantable article of the quality desired. This agitation of the curd is important, for owing to the soft gluey consistency thereof when placed in the drum if the curd dropped some distance the screens or other devices which might be employed would become clogged, and the curd would then scorch and burn, which would ruin the article.

The method and the construction and operation of the apparatus will be understood from the foregoing description when taken in connection with the accompanying drawings.

The curd is obtained by eliminating the fat from the milk, this being usually done by a centrifugal machine or separator, and then subjecting the milk to chemicals, such as sulfuric acid, so as to reduce the curd to the proper consistency in the usual or any preferred manner. In this state the soft casein curd is placed in the different pockets or divisions of the drum 16 by means of the doors 34. If the coils 11 are heated, the door 12 opened, and the fan 28 operated, air will be drawn in the direction of the arrows through the open hollow base 10 into the chamber 15 and in and through the drum, which latter, as before stated, is rotated by the worm-gear 20 and the worm 21. As the drum rotates the curd slides over the screens or perforated plates, if used, and by the vibratory motion of the same will be broken or separated into particles, and in this way the heated air will come in contact more or less with every portion thereof, the curd during the rotary motion being constantly subjected to light through the transparent or translucent plates 37. After the curd has been rotated until the article has been thoroughly treated, which sometimes requires about eighteen hours, the doors 35 are opened and the dry material is removed from the openings in the drum covered by the doors 34 or permitted to fall through the same upon the hollow base 10, from which it may be forced or drawn into the trough 10ª, and from there removed and placed in any suitable receptacle or device for transportation or other purposes.

I thus provide a simple and efficient method and apparatus for manufacturing an article for use in sizing paper which is of the desired quality and whiteness and which is under complete control while being treated. This article is at one step in the method a casein curd, but when completed as described it ceases to be a curd and becomes a material suitable for use as a size.

Having thus described my invention, I claim as new and desire to secure by Letters Patent—

1. The herein-described method of treating casein for use in the manufacture of paper, which consists in eliminating the fat from milk, reducing the same to a curd, agitating the curd and forcing heated air through the material during the agitation and until the material is thoroughly dry.

2. The herein-described method of treating casein for use in the manufacture of paper, which consists in eliminating the fat from milk, reducing the milk to a curd, agitating the curd, and submitting the curd to the action of light and heated air while it is being agitated and until the material is thoroughly dry, substantially as described.

3. The herein-described method of treating casein for use in the manufacture of paper, which consists in removing the fat from milk, reducing the milk to a curd, keeping the curd in a state of agitation and vibration to break and gradually pulverize the same and subjecting the curd while being agitated and vibrated to the action of light and heated air until thoroughly dry, substantially as described.

4. An apparatus of the kind described comprising a hollow base containing means for heating air within it, means for admitting air to one end of the base, a chamber projecting upward from the opposite end of the base, said chamber opening from the base, a rotatable drum lying parallel with and above the base, said drum being mounted at one end in the chamber and provided at both ends with screen-covered openings, radially-arranged pockets in the drum, and means for exhausting the air from the drum, chamber and base, substantially as described.

5. An apparatus of the kind described, comprising a hollow base containing a heating-coil, a door at one end of the base, a chamber at the opposite end, said chamber projecting upward above the base, a rotatable drum having screened end openings, one end of the drum being held in the aforesaid chamber, and means as an exhaust-fan for withdrawing the air from the drum and chamber, substantially as described.

LUCIUS AXTELL.

Witnesses:
A. M. CABLE,
FRANK COLE.